United States Patent
Kloss

(10) Patent No.: US 10,508,742 B2
(45) Date of Patent: Dec. 17, 2019

(54) VALVE CAGE ASSEMBLY

(71) Applicant: CIRCOR INTERNATIONAL, INC., Burlington, MA (US)

(72) Inventor: James Kloss, Tampa, FL (US)

(73) Assignee: CIRCOR INTERNATIONAL, INC., Burlington, MA (US)

( * ) Notice: Subject to any disclaimer, the term of this patent is extended or adjusted under 35 U.S.C. 154(b) by 192 days.

(21) Appl. No.: 15/793,151

(22) Filed: Oct. 25, 2017

(65) Prior Publication Data

US 2019/0120388 A1   Apr. 25, 2019

(51) Int. Cl.
   *F16K 1/36*   (2006.01)
   *F16K 1/50*   (2006.01)
   *F16K 3/26*   (2006.01)

(52) U.S. Cl.
   CPC ............ *F16K 1/36* (2013.01); *F16K 1/50* (2013.01); *F16K 3/267* (2013.01)

(58) Field of Classification Search
   None
   See application file for complete search history.

(56) References Cited

U.S. PATENT DOCUMENTS

| | | | |
|---|---|---|---|
| 1,752,790 A | | 1/1926 | Estep |
| 3,123,091 A | * | 3/1964 | Elsey .................. F16K 31/126 137/270 |
| 3,542,056 A | * | 11/1970 | Chinn .................. F16K 39/022 137/271 |
| 4,137,934 A | * | 2/1979 | Rice ........................ F16K 1/44 137/270 |
| 4,617,963 A | | 10/1986 | Stares |
| 5,615,708 A | | 4/1997 | Barron |
| 6,394,134 B1 | * | 5/2002 | Kwon ..................... F16K 47/08 137/625.3 |
| 8,740,179 B2 | | 6/2014 | Griffin, Jr. et al. |
| 2007/0272316 A1 | | 11/2007 | Zecchi et al. |

OTHER PUBLICATIONS

European Search Report and Written Opinion for the European Patent Application No. EP18200581, dated Mar. 21, 2019, 7 pages.

* cited by examiner

*Primary Examiner* — John Fox

(57) ABSTRACT

A cage assembly for a valve includes a hollow first member having a first end for operably connecting to a valve body and an opposed second end for receiving a hollow second member. The assembly includes the second member having a third end for receiving a hollow third member, the second member including first openings formed through a sidewall, and the third member having a fourth end for operably connecting to the valve body. The assembly includes when assembled inside the valve body, the first member, the second member and the third member forming an aligned second opening therethrough, the second opening having a uniform cross section, for slidably receiving a valve closure element for controlling a flow of fluid through the first openings during operation of the valve.

19 Claims, 5 Drawing Sheets

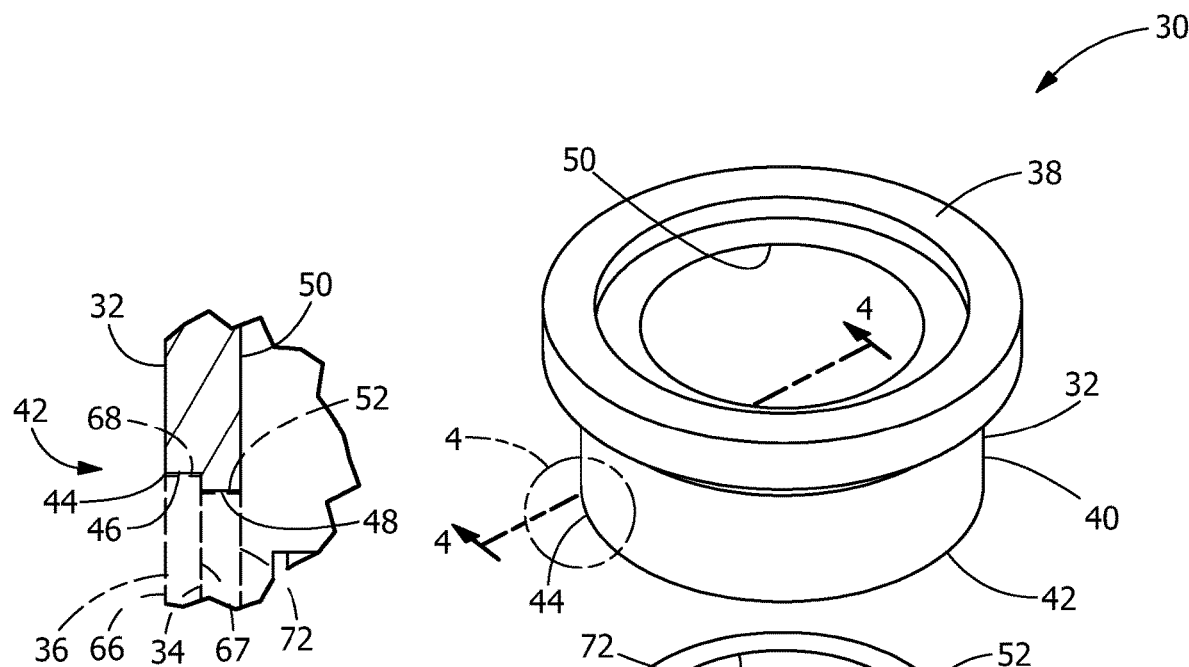
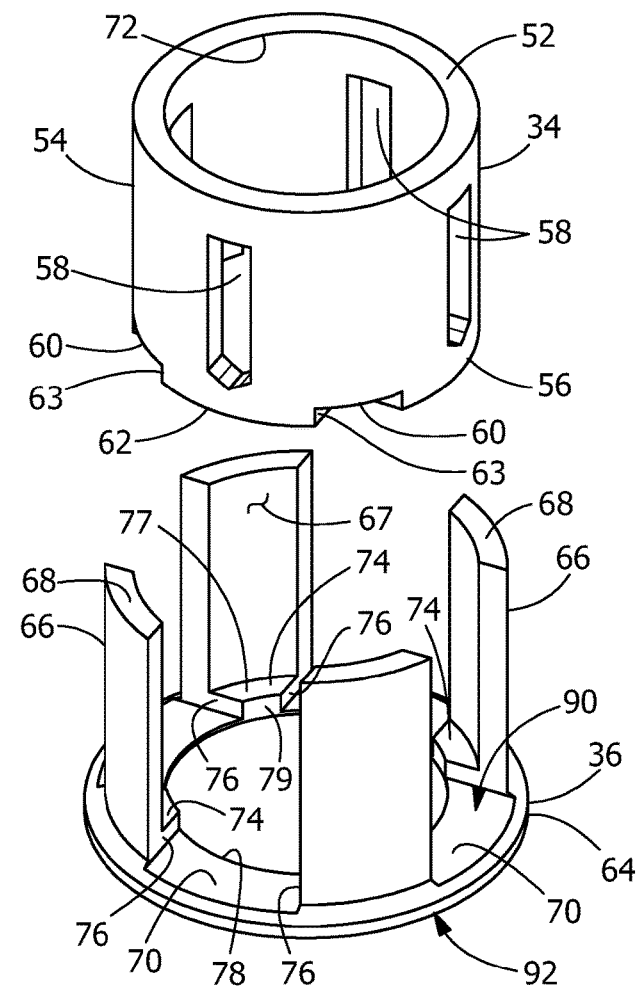
FIG. 4
FIG. 3

VALVE CAGE ASSEMBLY

FIELD OF THE INVENTION

The present invention is directed to a valve and method for controlling fluid flow behavior therethrough, and specifically to a valve and method for achieving fluid flow control behavior using a valve cage assembly.

BACKGROUND OF THE INVENTION

Valves are widely used in fluid systems to provide controlled fluid flow behavior in the systems. Many valves include a conventional cage 10, such as shown in FIG. 1, having a hollow unitary or one-piece body 11 defined by an axial opening 16 extending through opposed ends 12, 14. Flow control openings 18 extend through the sidewall of body 11. With cage 10 positioned inside a valve 20 in a conventional arrangement as shown in FIG. 2, a valve closure unit or plug 22 that is selectably slidably movable in opening 16 controls fluid flow 24 from a valve inlet 26, through flow control openings 18 of cage 10, to a valve outlet 28.

It is noteworthy that fluid flow control requirements for valves are application dependent. For example, the flow control openings 18 of cage 10 of FIG. 1, which may be suitable for use in the above-referenced valve 20 at a first location in a fluid system, may be unsuitable for use in another valve otherwise identical to valve 20 that is positioned at a second location of the fluid system. That is, other than the differently configured flow control openings, which make up a relatively small portion of the respective cages, the remainder of the cages may be identical. As a result, the flow control openings of the cage suitable for use in the valve positioned at the second location would need to be reconfigured, requiring replacement of the cage in its entirety. Additionally, in order for some valves to be adapted for certain applications, such as high temperature applications, the entire cages may need to be composed of a special material or subjected to a treatment, even if only a portion of the cage is subjected to the high temperatures during operation of the valve, resulting in added costs.

What is needed is a valve cage and method for making a valve cage that does not suffer from these drawbacks.

SUMMARY OF THE INVENTION

The present invention relates to a cage assembly for a valve including a hollow first member having a first end for operably connecting to a valve body and an opposed second end for receiving a hollow second member. The assembly includes the second member having a third end for receiving a hollow third member, the second member including first openings formed through a sidewall, and the third member having a fourth end for operably connecting to the valve body. The assembly includes when assembled inside the valve body, the first member, the second member and the third member forming an aligned second opening therethrough, the second opening having a uniform cross section, for slidably receiving a valve closure element for controlling a flow of fluid through the first openings during operation of the valve.

The present invention further relates to a valve including a valve body having a bonnet and a seat ring, and a hollow first member having a first end operably connected to the bonnet and an opposed second end receiving a hollow second member. The valve includes the second member having a third end receiving a hollow third member, the second member including first openings formed through a sidewall, and the third member having a fourth end operably connected to the seat ring. The valve includes when assembled inside the valve body, the first member, the second member and the third member forming an aligned second opening therethrough, the second opening having a uniform cross section, for slidably receiving a valve closure element for controlling a flow of fluid through the first openings during operation of the valve.

The present invention yet further relates to a method of changing a flow characteristic of a valve, including disassembling the valve sufficiently to access a cage assembly of the valve including a first member operatively connected to a second member operably connected to a third member, the second member including first openings formed through a sidewall, the first member, the second member, and the third member forming an aligned second opening therethrough for slidably receiving a valve closure element for controlling a flow of fluid through the first openings during operation of the valve, the second opening having a uniform cross section. The method further includes separating and removing the second member from the cage assembly, and replacing the second member with a fourth member having second openings formed through a sidewall, the second openings configured differently than the first openings. The method further includes reassembling the cage assembly to include the replaced fourth member, and reassembling the valve.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is an exploded view of an exemplary valve cage assembly according to the present invention.

FIG. 4 is a partial cross-section taken along line 4-4 of a region 4 of the valve cage assembly of FIG. 3 according to the present invention.

Wherever possible, the same reference numbers will be used throughout the drawings to refer to the same or like parts.

DETAILED DESCRIPTION OF THE INVENTION

Figure 1:
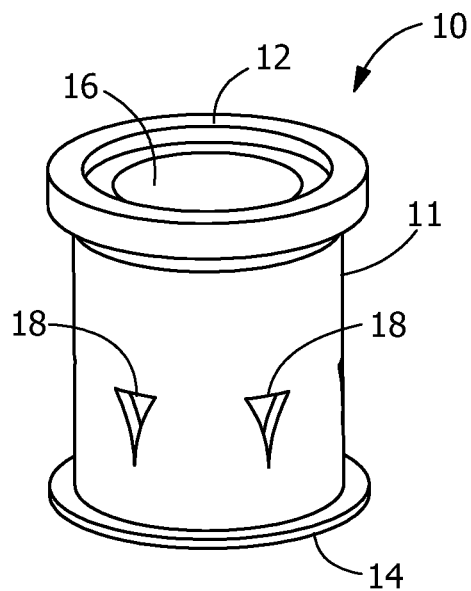
FIG. 1 is an upper perspective view of a prior art valve cage.
Figure 2:
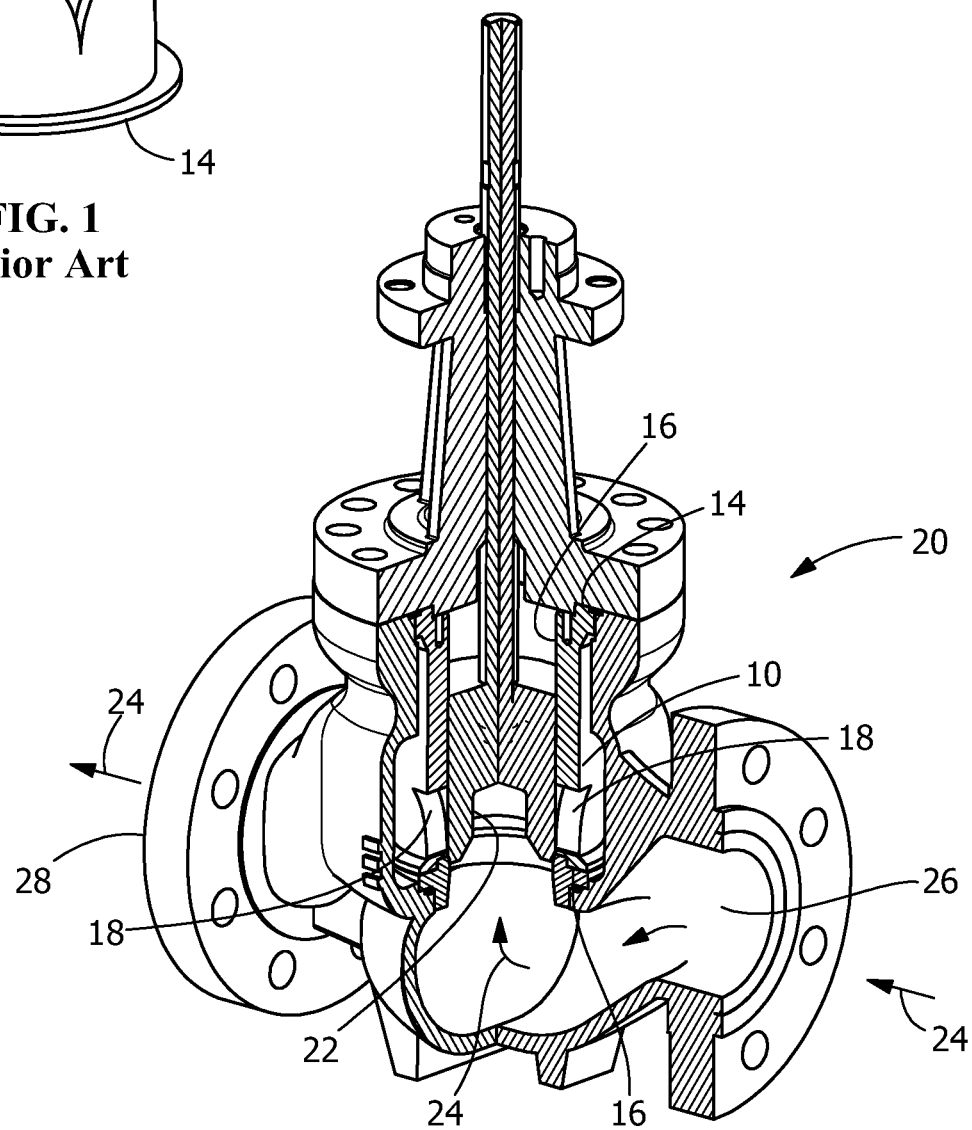
FIG. 2 is a partial cutaway upper perspective view of the prior art valve cage of FIG. 1 installed in a valve.
Figure 5:
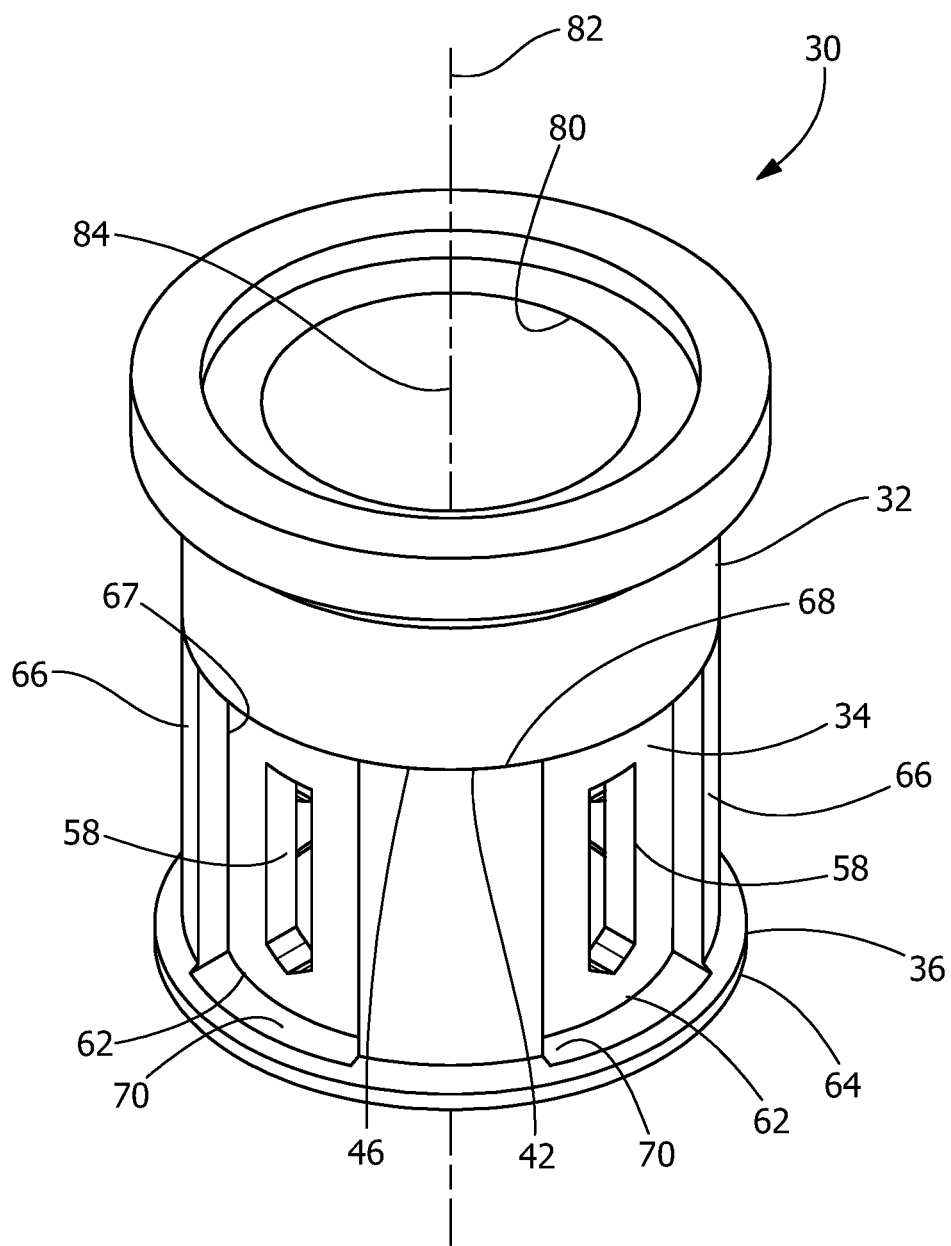
FIG. 5 is an upper perspective view of the assembled valve cage assembly of FIG. 3 according to the present invention.

FIG. 3 is an exploded view of an exemplary generally cylindrical valve cage assembly 30 that is shown assembled in FIG. 5. Valve cage assembly 30 includes members 32, 34, 36 that when are assembled together (FIG. 5), operates in a manner similar to cage 10 (FIG. 1). Member 32 includes an end 38 for operably connecting to a valve body 21 of valve 20 (FIG. 6), and more specifically, to a bonnet 86 (FIG. 6) of valve 20. As further shown in FIG. 3, end 38 is separated from an opposed end 42 by a sidewall 40. Member 32 is hollow, with an opening 50 extending through ends 38, 42. End 42 is shown in FIG. 4, which is a partial cross-section taken along line 4-4 of a region 4 of the valve cage assembly of FIG. 3. Peripheral edge 44 of end 42 is shown in each of FIG. 3 and FIG. 4 for purposes of orientation. End 42 includes a surface 48 into which a shoulder 46 is formed along the bottom of sidewall 40 opposite opening 50 and which shoulder forms peripheral edge 44 in sidewall 40.

As further shown in FIG. 3, member 34 includes an end 52 separated from an opposed end 56 by a sidewall 54. As shown in FIG. 4, when members 32, 34 are assembled together, end 52 of member 34 abuts surface 48 of member 32, and end 56 is operatively connected to member 36. Member 34 is hollow, with an opening 72 extending through ends 52, 56. A plurality of openings 58, such as four, are formed through sidewall 54. In one embodiment, the number of openings 58 formed through sidewall 54 may be different than four. Openings 58 establish the flow characteristics of a fluid through a valve, with changing or reconfiguring the shape or profile of the openings resulting in changes in the flow characteristics of a valve. That is, by only utilizing different members 34, i.e., reconfiguring only the openings 58 of otherwise similar members 34, and changing no other components of a valve, the same valve can exhibit different flow characteristics.

Figure 6:
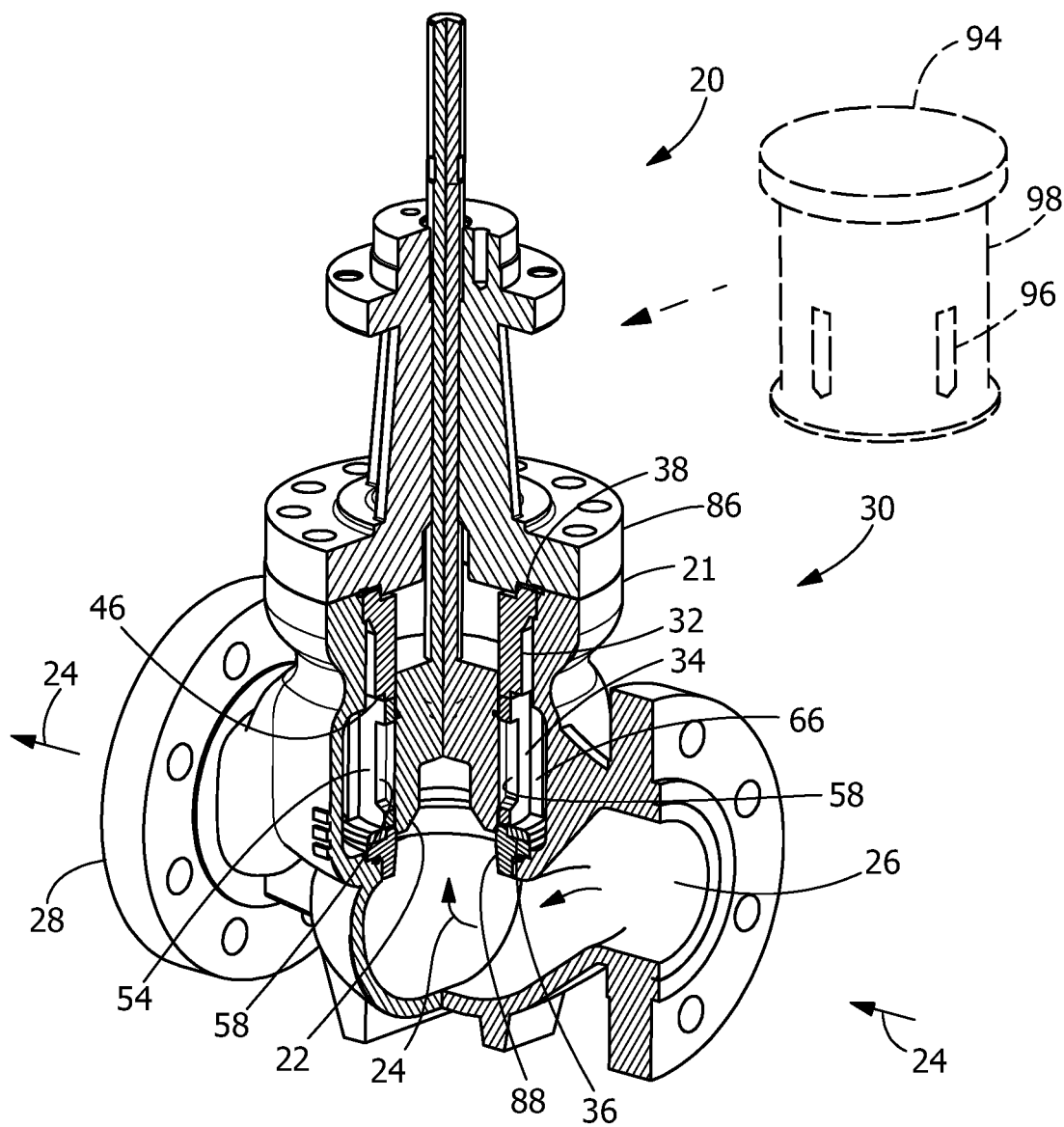
FIG. 6 is a partial cutaway upper perspective view of the valve cage assembly of FIG. 5 installed in a valve according to the present invention.

As further shown in FIG. 3, member 36 includes a base portion 64 that receives end 56 of member 34 on one side or end 90 of base portion 64 of member 36, and the other side or end 92 of base portion 64 is operably connected to the valve body 21 (FIG. 6), and more specifically, to a seat ring 88 (FIG. 6) when member 36 is inserted inside valve 20 (FIG. 6). Member 36 is hollow, with an opening 78 formed through base portion 64. Base portion 64 includes a surface 70 having at least one anti-rotation feature 74. As shown, four anti-rotation features 74 are formed thereon or protruding outwardly from surface 70. In one embodiment, the anti-rotation features 74 may be formed therein or at least partially recessed in surface 70, with the number of anti-rotation features 74 being different than four. As shown, anti-rotation features 74 include opposed tapered surfaces 76, generally forming a V shape, with surfaces 76 converging toward opening 78, and a cap or top surface 77 extending between surfaces 76. The V-shaped surfaces 76 form a base surface 79 extending generally coincident with opening 78. End 56 of member 34 includes anti-rotation features 60 having opposed tapered surfaces 63 that correspond to tapered surfaces 76 of member 36. As a result of the assembly of members 32, 34, 36 (FIG. 5) of cage assembly 30, engagement of corresponding anti-rotation features 60, 74 prevent rotation of member 34 relative to member 36 about an axis 82 of opening 80, which opening 80 being formed from the aligned openings 50, 72, 78 of respective members 32, 34, 36. Aligned openings 50, 72, 78 not only are mutually aligned with axis 82 (FIG. 5), but these openings define a continuous surface having a uniform cross section for receiving valve member 22 (FIG. 6). In addition to the corresponding anti-rotation features 60, 74 of assembled members 34, 36 corresponding regions between the anti-rotation features are also brought together to establish a generally fluid tight seal between ends 56, 90 of members 34, 36. As shown, end 90 of member 36 includes portions of surface 70 positioned between facing surfaces 76 of adjacent anti-rotation features 74 which receive corresponding lobes 62 positioned at ends 56 of member 34 between surfaces 63 of adjacent anti-rotation features 60.

As shown in FIG. 5, opening 80 is generally circular, with axis 82 being coincident with a center 84. In one embodiment, anti-rotation features may alternatively or additionally be included in member 32 and member 34, such as being formed in respective ends 42, 52. That is, one or both of ends 52, 56 of member 34 may include anti-rotation features for corresponding with one or both of respective ends 42, 90 of member 32, 34 (end 90 of base portion 64 of member 34) for preventing rotation of member 34 relative to at least one of members 32, 36.

FIG. 3 shows a plurality, such as four support portions 66 extending outwardly from surface 70 of base portion 64 of member 36 to respective ends 68. As further shown in FIG. 3, the base of each support portion 66 corresponds to or is a radially aligned with an anti-rotation feature 74. In one embodiment, less than all, or none of support portions 66 correspond to or are radially aligned with anti-rotation features 74. Support portions 66 include surfaces 67 facing opening 78. As shown in FIGS. 4 and 5 with members 32, 34, 36 of cage assembly 30 assembled together, surfaces 67 of support portions 66 are conformal with the outer surface of member 34, and at least partially laterally surround member 34, providing lateral support to and securing member 34 in an aligned position relative to member 36. Support portions 66 laterally surround member 34, but do not align with or partially cover openings 58 of member 34, so as not to impede fluid flow through openings 58 during operation of the valve.

As shown in FIG. 4, when members 32, 34, 36 are assembled together inside of a valve, end 52 of member 34 abuts and provides supporting contact to surface 48 of member 32, and end 68 abuts and provides supporting contact to shoulder 46, providing a structurally supported and generally fluid tight joint therebetween.

Valve cage design is largely dictated by the following variables: operating temperature, valve size, travel length of the valve plug, volumetric flow rate, and flow control characteristics. As a result, valve cages must typically be custom-made for each customer, due to the rarity of each variable matching for different customers.

The novel arrangement of the valve cage assembly the present invention provides numerous benefits. A first benefit is associated with breaking down the conventional valve cage into three smaller, modular components (members 32, 34, 36), due to manufacturing simplification. For example, if a customer is able to utilize the same valve size, even if other variables are different from each other, based upon different application, such as flow control characteristics, which would require differently configured openings 58 (FIG. 3) for member 34, members 32, 36 would remain the same. That is, members 32, 36 would be standardized or stockable components, only requiring custom design and manufacturing of different members 34. By reducing the size and complexity of the "custom" members 34, the lead times associated with the "custom" members 34 would be reduced as compared to the conventional unitary or one-piece construction valve cages.

An additional benefit is associated with adapting some valves for certain applications, such as high temperature applications. Conventional one-piece cages, in which the entire cage would typically need to be composed of a special material or subjected to a treatment, such as a gas-nitriding heat treatment or application of a special coating even if only a portion of the cage is subjected to the high temperatures during operation of the valve. If the one-piece cage is damaged during the treatment, repair is difficult. Modification of the one-piece cage after nitriding is difficult. In contrast, only the "standardized" member 32 may require the special heat treatment, thereby reducing the chance of destroying the more costly-to-manufacture member 34, due to the customized openings 58 (FIG. 3). Stated another way, one or more of members 32, 34, 36 may have a different material composition, a different heat treatment and a different coating, or a combination thereof, sufficient to satisfy application/performance requirements, while providing the opportunity to reduce costs.

A further benefit is associated with ease of assembly/disassembly, compared to conventional one-piece cages. Cages, which can accommodate valve plugs ranging in size from about 1 inch to 22 inches in diameter, or larger can become extremely heavy and unwieldy. The modular cage assembly of the present invention is comprised of smaller cage members, which likewise are comparatively easier to handle than the conventional cages. Moreover, as a result of the additional interconnected mating ends of the modular cage members, i.e., between members 32 and 34 and between members 34 and 36, there is an increased possibility that at least one of these additional interconnections may be more easily separated from each other, versus only the pair of interconnections between the opposed ends of the conventional one-piece cage and the corresponding valve bonnet and valve seat ring, which separation must occur to permit disassembly of valve before the cage can be accessed.

Figure 7:
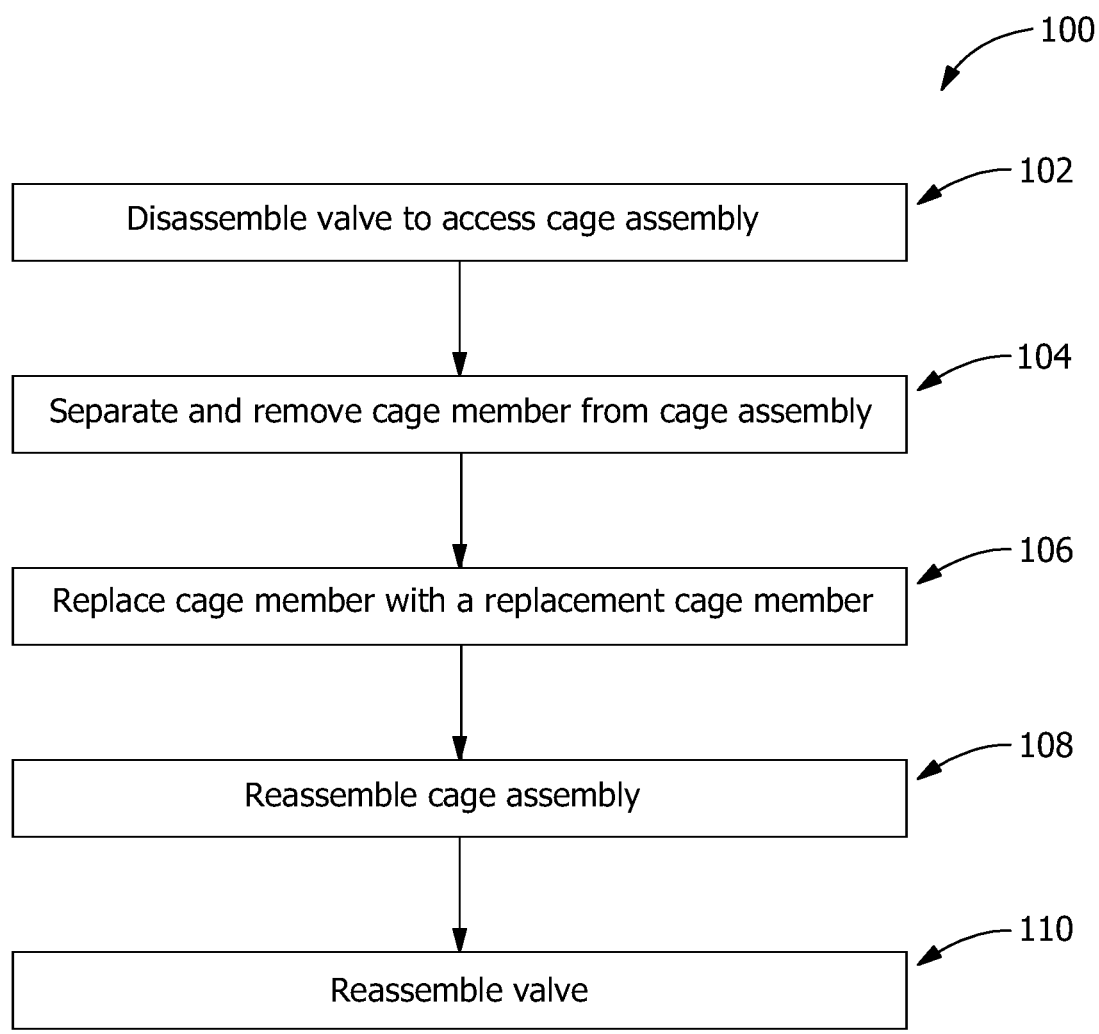
FIG. 7 is a flow chart of a method of changing a flow characteristic of a valve operating an electrical system, according to the present invention.

FIG. 7 is a flowchart of a method 100 of changing a flow characteristic of a valve. At block 102, valve 20 (FIG. 6) is sufficiently disassembled to access a cage assembly 30 of the valve 20 comprising: a member 32 operatively connected to a second member 34 operably connected to a third member 36, the member 34 including first openings 58 formed through a sidewall 54. At block 104, member 34 is separated and removed from cage assembly 30. At block 106, member 34 is replaced with a replacement member 94 having openings 96 formed through a sidewall 98, openings 96 configured differently than the openings 58. At block 108, cage assembly 30 is reassembled to include replacement member 94. At block 110 valve 20 is reassembled.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A cage assembly for a valve comprising:
a hollow first member having a first end for operably connecting to a valve body and an opposed second end for receiving a hollow second member,
the second member having a third end for receiving a hollow third member, the second member including first openings formed through a sidewall;
the third member having a fourth end for operably connecting to the valve body;
wherein when assembled inside the valve body, the first member, the second member and the third member forming an aligned second opening therethrough, the second opening having a uniform cross section, for slidably receiving a valve closure element for controlling a flow of fluid through the first openings during operation of the valve; and
wherein the fourth end of the third member includes a base portion having at least two support portions extending therefrom for partially laterally surrounding the second member, the base portion includes an anti-rotation feature for engaging with a corresponding anti-rotation feature of the second member for preventing rotation of the second member relative to the third member.

2. The cage assembly of claim 1, wherein the second member is selectably replaceable with a fourth member, the fourth member having third openings formed through a sidewall, the third openings configured differently relative to the first openings, thereby changing a flow characteristic of the valve during operation of the valve.

3. The cage assembly of claim 1, wherein at least one of the first member, the second member, and the third member are capable of having at least one of a different material composition, a different heat treatment and a different coating.

4. The cage assembly of claim 1, wherein the first member is a standardized component for a valve having a particular size.

5. The cage assembly of claim 1, wherein the third member is a standardized component for a valve having a particular size.

6. The cage assembly of claim 1, wherein the first end of the first member is for operably connecting to a valve bonnet.

7. The cage assembly of claim 1, wherein the fourth end of the third member is for operably connecting to a seat ring of the valve.

8. The cage assembly of claim 1, wherein at least one of the second end of the first member and an end of the third member for being received by the third end of the second member includes an anti-rotation feature for preventing rotation of the second member relative to the corresponding first member and third member.

9. The cage assembly of claim 1, wherein the first member includes a shoulder, wherein upon assembly of the first member, the second member and the third member to each other, each support portion of the third member partially laterally surrounding the second member and in supporting contact with the shoulder.

10. A valve comprising:
a valve body having a bonnet and a seat ring;
a hollow first member having a first end operably connected to the bonnet and an opposed second end receiving a hollow second member,
the second member having a third end receiving a hollow third member, the second member including first openings formed through a sidewall;
the third member having a fourth end operably connected to the seat ring,
wherein when assembled inside the valve body, the first member, the second member and the third member forming an aligned second opening therethrough, the second opening having a uniform cross section, for slidably receiving a valve closure element for controlling a flow of fluid through the first openings during operation of the valve;

wherein the fourth end of the third member includes a base portion having at least two support portions extending therefrom for partially laterally surrounding the second member.

11. The cage assembly of claim 10, wherein the second member is selectably replaceable with a fourth member, the fourth member having third openings formed through a sidewall, the third openings configured differently relative to the first openings, thereby changing a flow characteristic of the valve during operation of the valve.

12. The valve of claim 10, wherein at least one of the first member, the second member, and the third member are capable of having at least one of a different material composition, a different heat treatment and a different coating.

13. The valve of claim 10, wherein the first member is a standardized component for a valve having a particular size.

14. The valve of claim 10, wherein the third member is a standardized component for a valve having a particular size.

15. The valve of claim 10, wherein at least one of the second end of the first member and an end of the third member for being received by the third end of the second member includes an anti-rotation feature for preventing rotation of the second member relative to the corresponding first member and third member.

16. The valve of claim 10, wherein the base portion includes an anti-rotation feature for engaging with a corresponding anti-rotation feature of the second member for preventing rotation of the second member about the second opening relative to the third member.

17. The valve of claim 6, wherein the first member includes a shoulder, wherein upon assembly of the first member, the second member and the third member to each other, each support portion of the third member partially laterally surrounding the second member and in supporting contact with the shoulder.

18. A method of changing a flow characteristic of a valve, comprising:
   disassembling the valve sufficiently to access a cage assembly of the valve comprising:
   a first member operatively connected to a second member operably connected to a third member, the second member including first openings formed through a sidewall, the first member, the second member, and the third member forming an aligned second opening therethrough for slidably receiving a valve closure element for controlling a flow of fluid through the first openings during operation of the valve, the second opening having a uniform cross section; wherein the third member has a fourth end operably connected to a seat ring, the fourth end of the third member including a base portion and the base portion includes an anti-rotation feature for engaging with a corresponding anti-rotation feature of the second member for preventing rotation of the second member about the second opening relative to the third member
   separating and removing the second member from the cage assembly;
   replacing the second member with a fourth member having second openings formed through a sidewall, the second openings configured differently than the first openings;
   reassembling the cage assembly to include the replaced fourth member; and
   reassembling the valve.

19. The method of claim 18, wherein the base portion has at least two support portions extending therefrom for partially laterally surrounding the second member.

* * * * *